Figure 1:
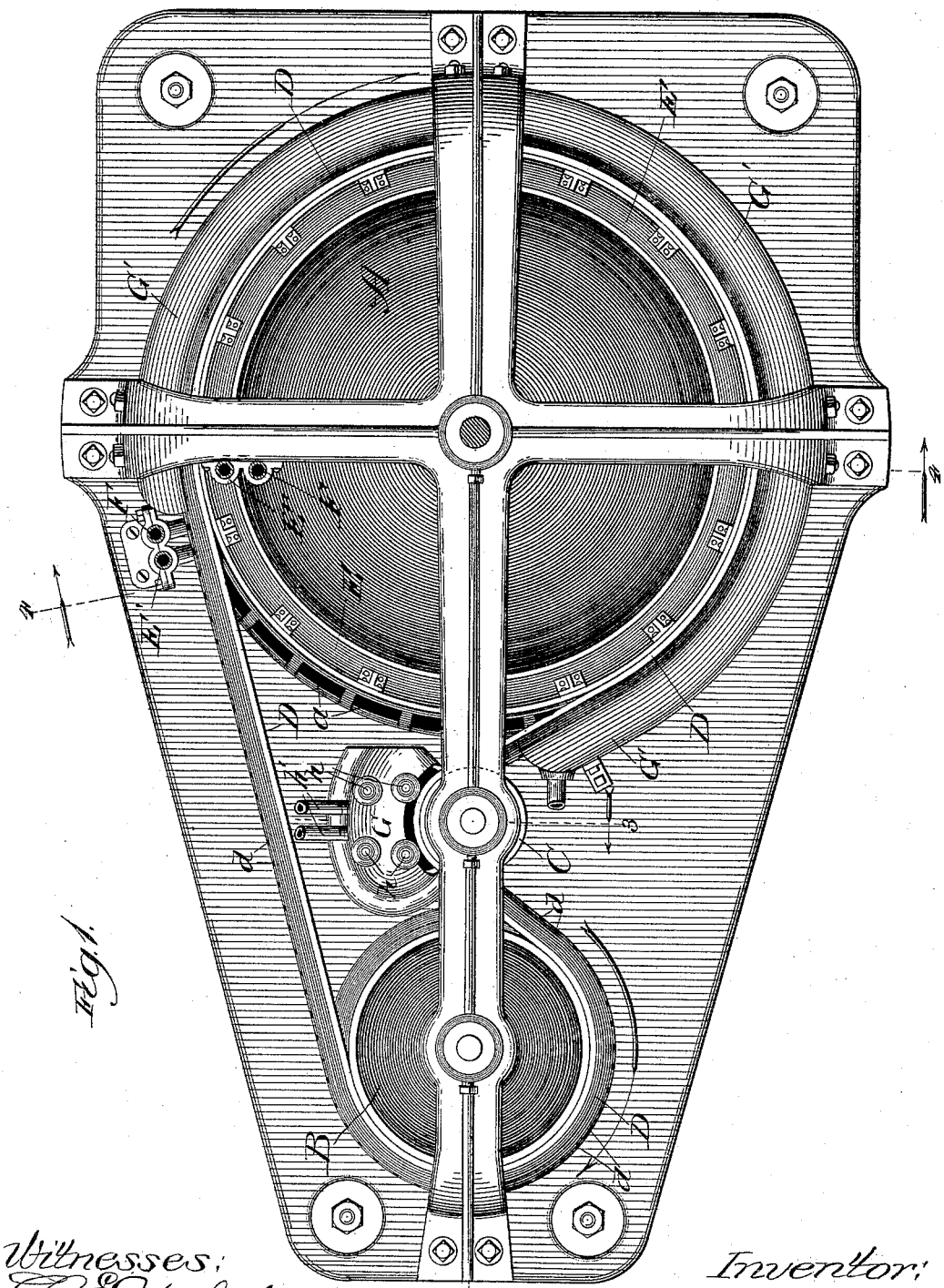

(No Model.)  7 Sheets—Sheet 1.

O. B. PECK.
CENTRIFUGAL ORE SEPARATOR.

No. 495,681.  Patented Apr. 18, 1893.

Witnesses:
Chas. E. Gaylord
Clifford N. White

Inventor:
Orrin B. Peck.
By Banning & Banning & Payson
Attys.

(No Model.) 7 Sheets—Sheet 2.
O. B. PECK.
CENTRIFUGAL ORE SEPARATOR.
No. 495,681. Patented Apr. 18, 1893.
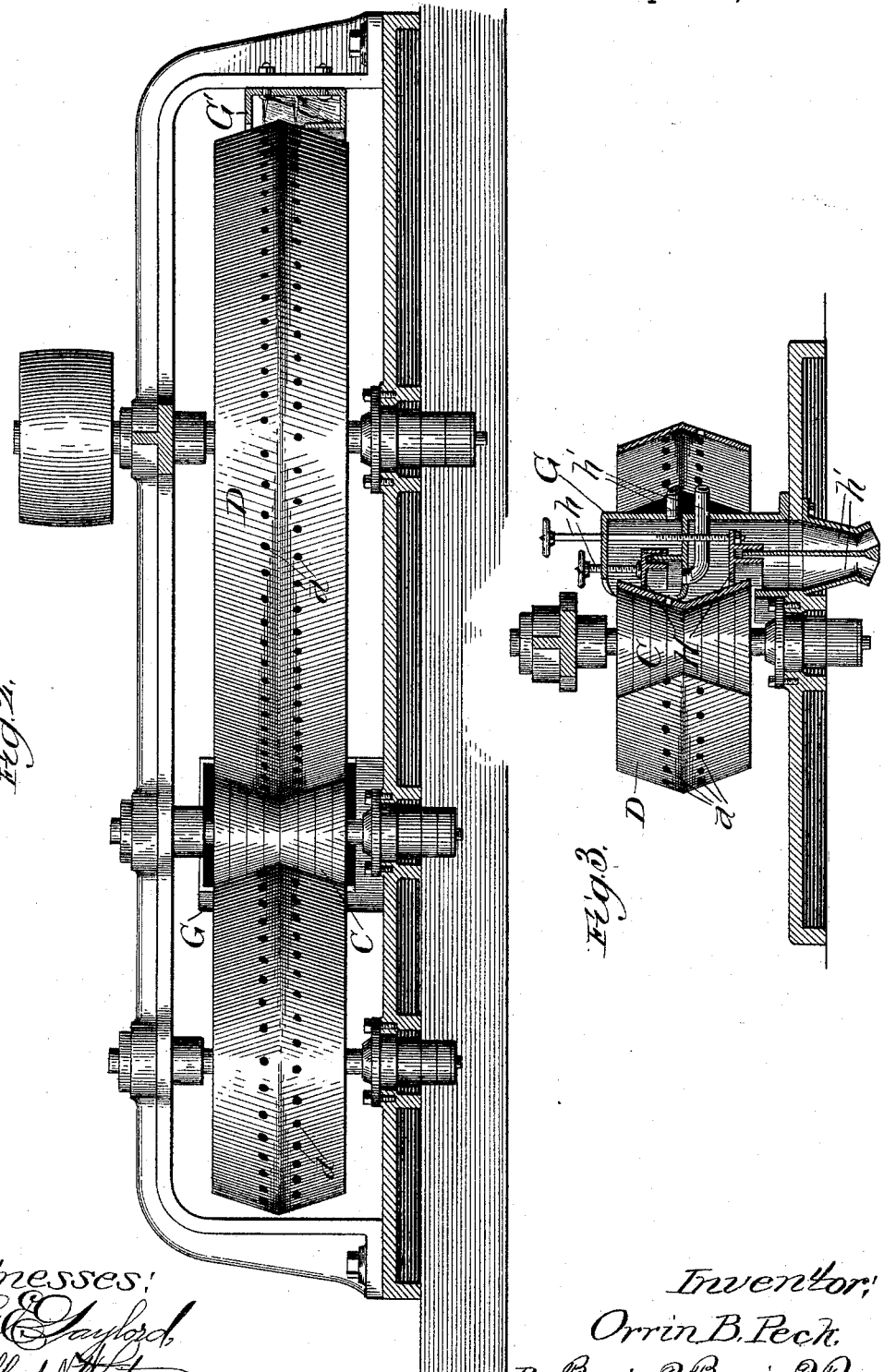
Witnesses:
Inventor:
Orrin B. Peck.

(No Model.) 7 Sheets—Sheet 3.
O. B. PECK.
CENTRIFUGAL ORE SEPARATOR.
No. 495,681. Patented Apr. 18, 1893.
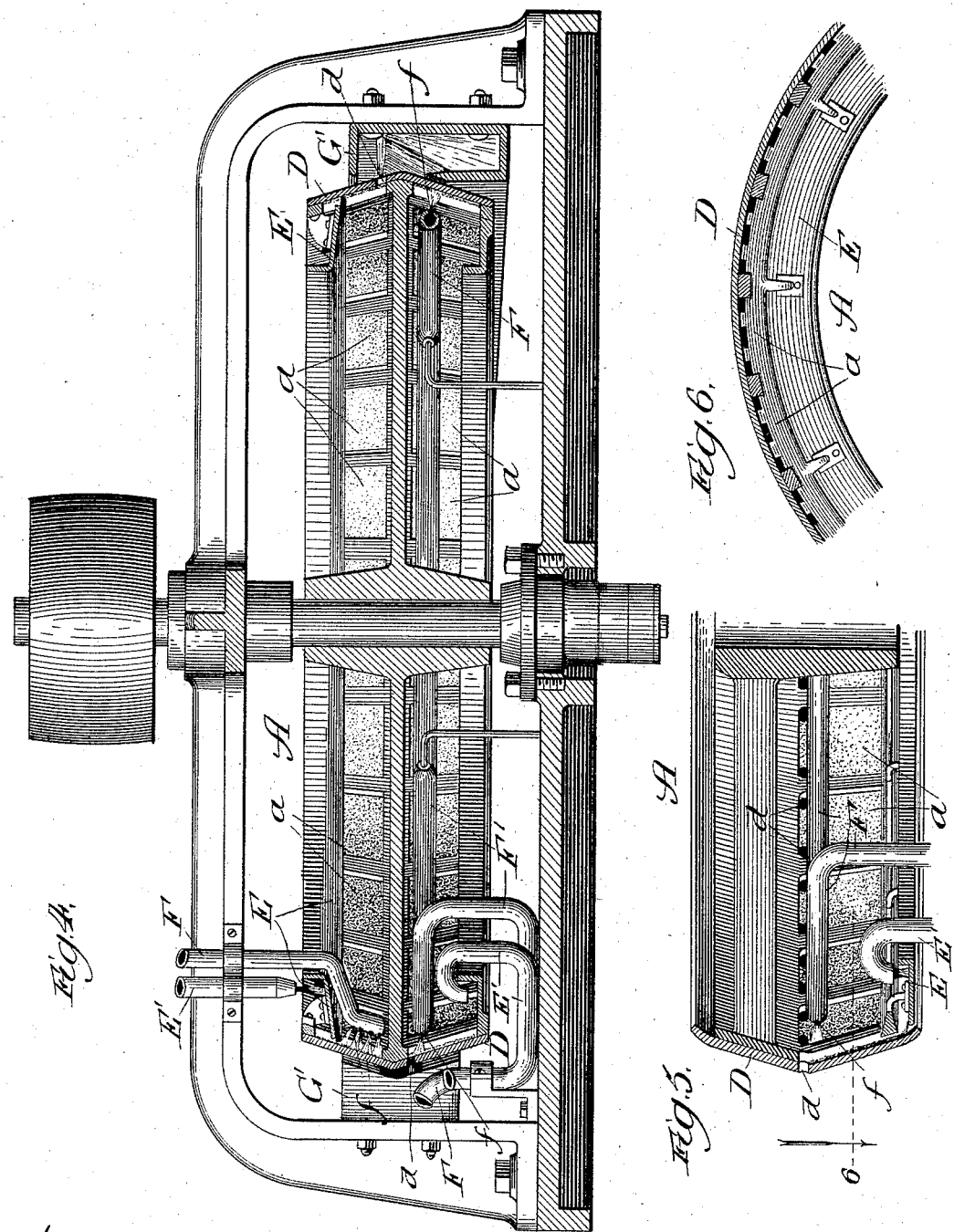
Witnesses:
Inventor:
Orrin B. Peck, (No Model.) 7 Sheets—Sheet 4.
O. B. PECK.
CENTRIFUGAL ORE SEPARATOR.
No. 495,681. Patented Apr. 18, 1893.
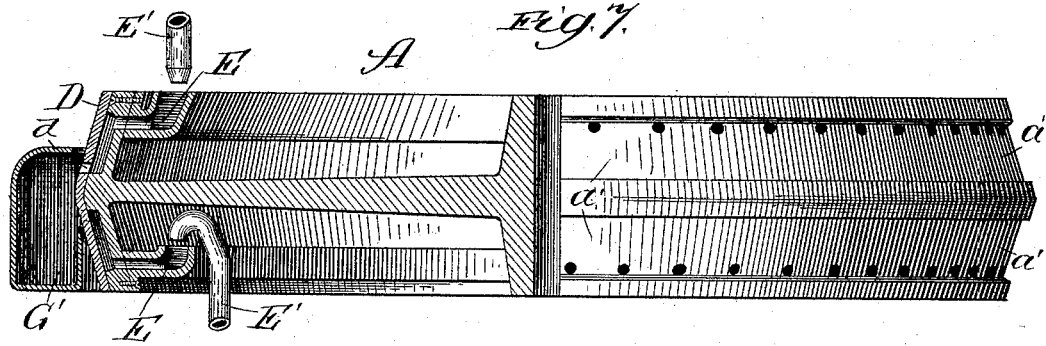
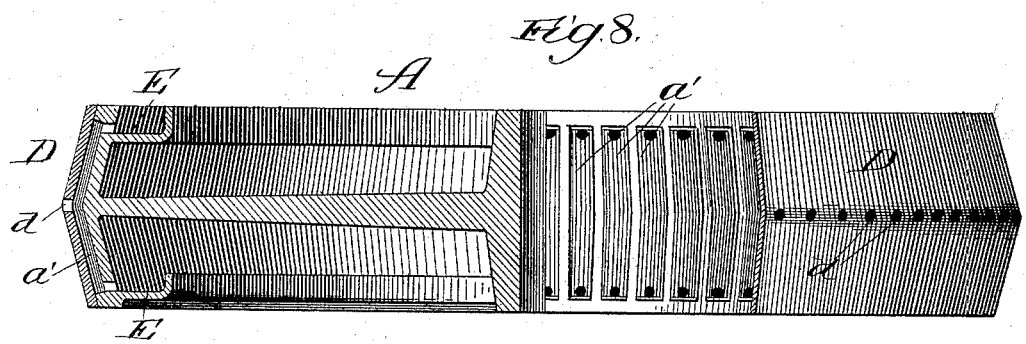
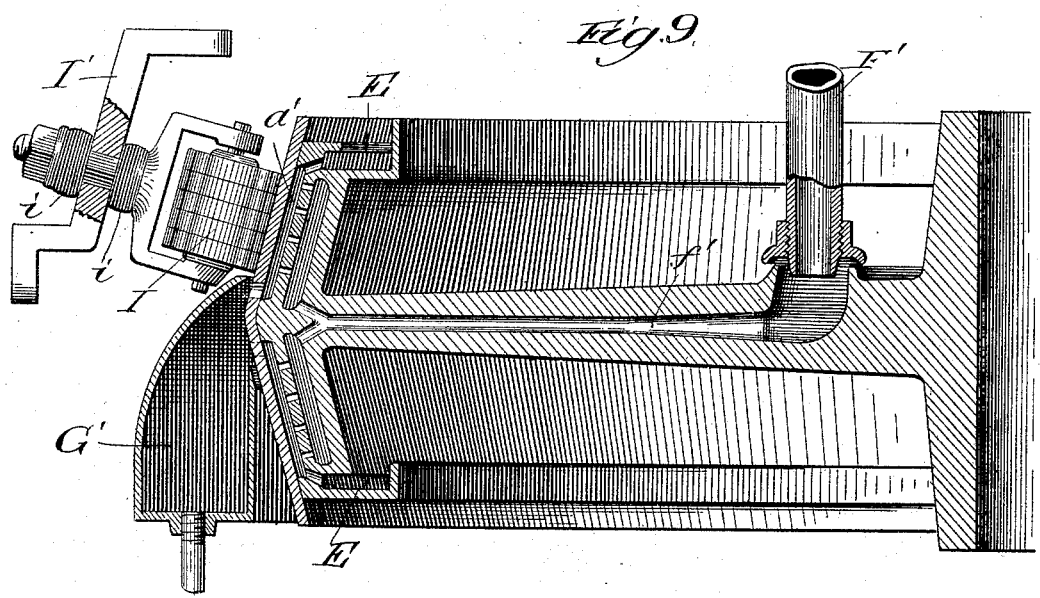

(No Model.) 7 Sheets—Sheet 5.
O. B. PECK.
CENTRIFUGAL ORE SEPARATOR.
No. 495,681. Patented Apr. 18, 1893.
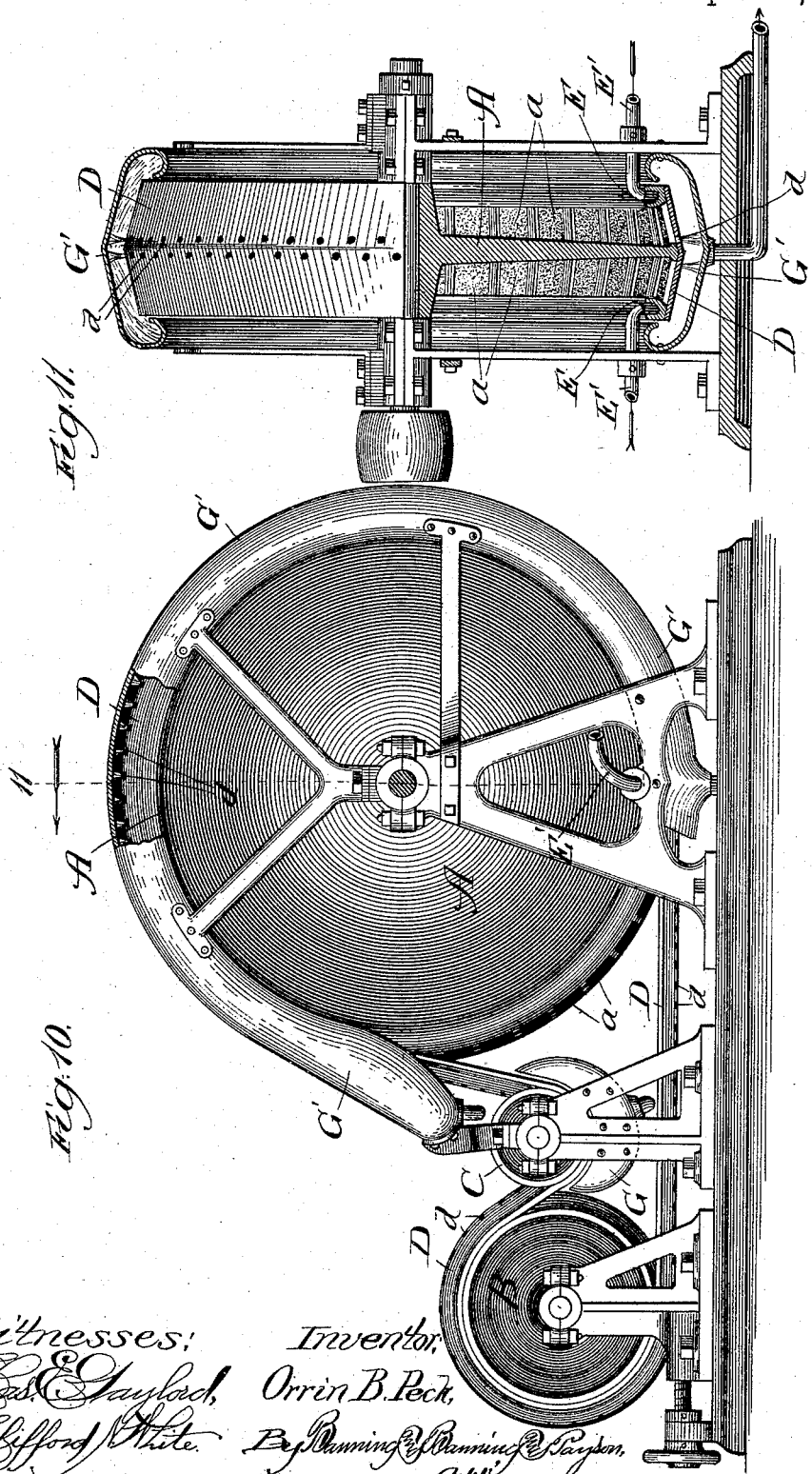

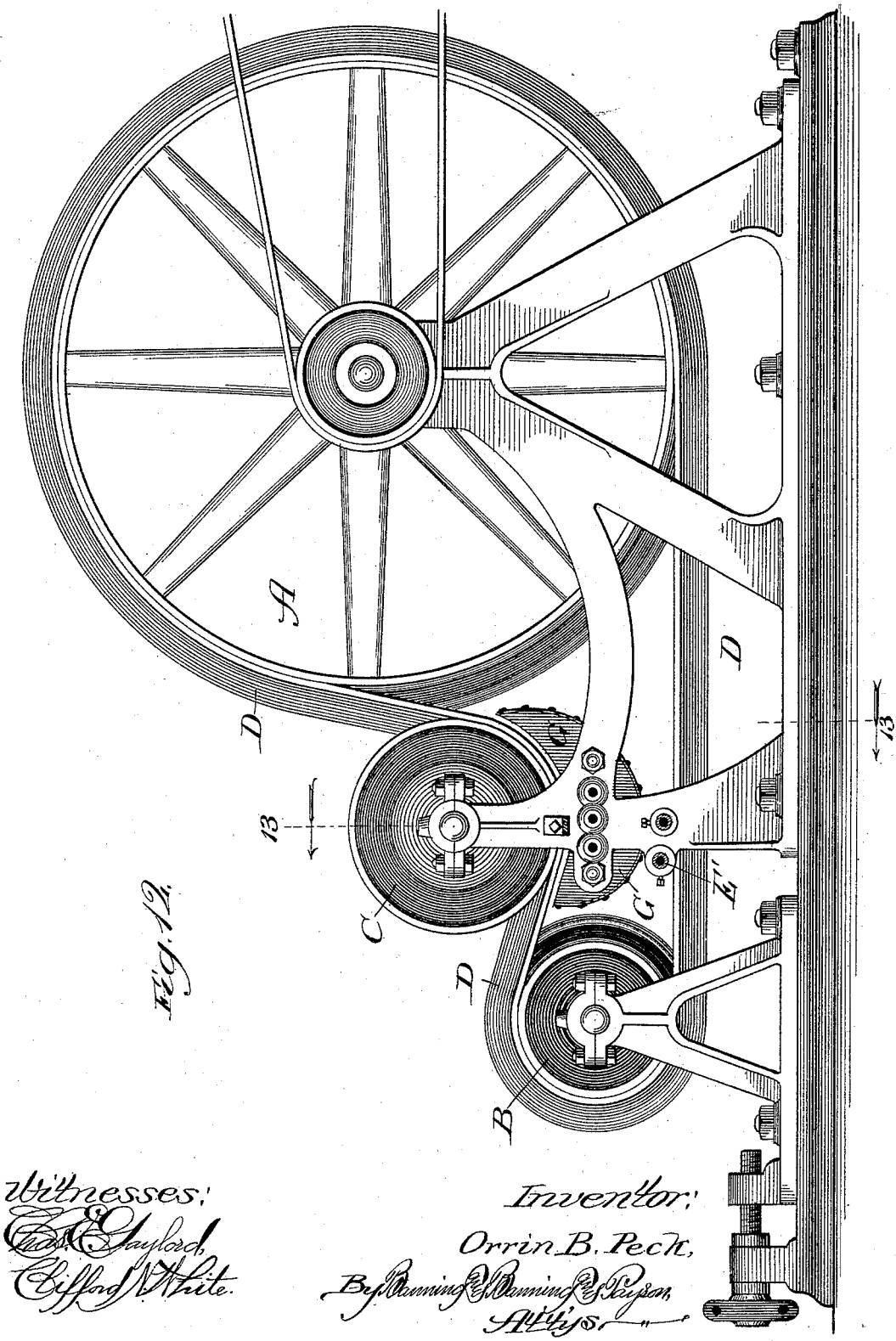

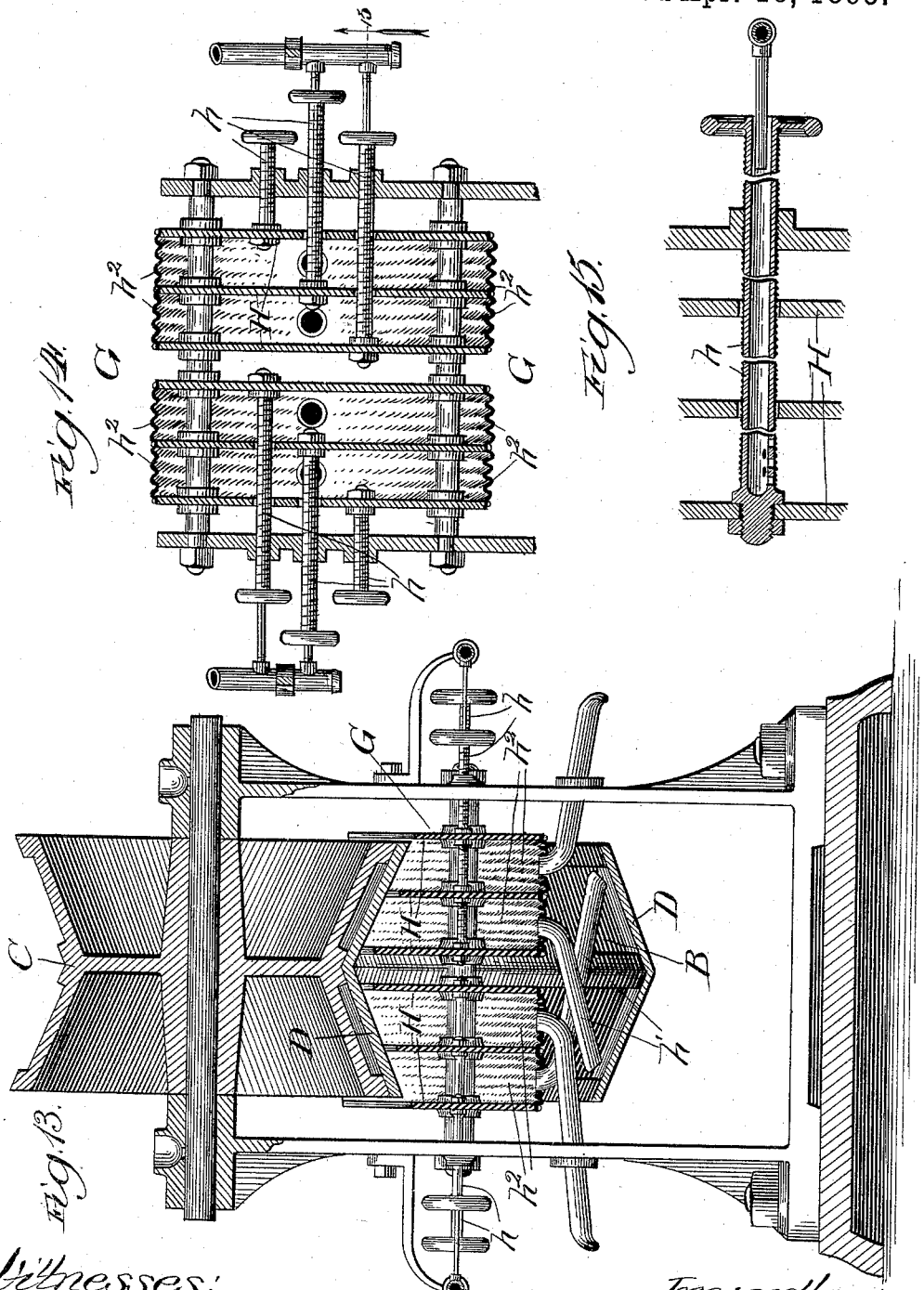

UNITED STATES PATENT OFFICE.

ORRIN B. PECK, OF CHICAGO, ILLINOIS, ASSIGNOR, BY MESNE ASSIGNMENTS, TO THE PATENT TITLE COMPANY, OF SAME PLACE.

CENTRIFUGAL ORE-SEPARATOR.

SPECIFICATION forming part of Letters Patent No. 495,681, dated April 18, 1893.

Application filed May 31, 1892. Serial No. 434,970. (No model.)

*To all whom it may concern:*

Be it known that I, ORRIN B. PECK, a citizen of the United States, residing at Chicago, Illinois, have invented certain new and useful Improvements in Centrifugal Ore-Separators, of which the following is a specification.

The improvements which I propose to describe and claim in this case are shown in part as the means employed for carrying out the process described and claimed in my application Serial No. 417,683, filed January 11, 1892, but are not made the subject of claims in such application.

The object of my invention in this case is to further perfect the apparatus described and claimed in my applications, Serial Nos. 417,683 and 417,685, filed January 11, 1892, in the various parts and details of construction hereinafter described and claimed.

In the drawings, Figure 1 is a plan view of my improved apparatus. Fig. 2 is a vertical section, partly in elevation, taken in the line 2 of Fig. 1, looking in the direction of the arrow. Fig. 3 is a vertical section, partly in elevation, taken in the line 3 of Fig. 1, looking in the direction of the arrow. Fig. 4 is a transverse vertical section, taken in the line 4 of Fig. 1, looking in the direction of the arrow. Fig. 5 is a section of a part of my improved pulley and belt, modified. Fig. 6 is a plan view of a section, taken in line 6 of Fig. 5, looking in the direction of the arrow. Figs. 7 and 8 are vertical sections, partly in elevation, of my improved pulley and belt, modified. Fig. 9 is a vertical section of a half of a modified form of my improved pulley and belt, on an enlarged scale, and some additional features, which will be hereinafter described. Fig. 10 is a side elevation, with a portion of the curbing broken away, of a modified application of my improved pulley and belt. Fig. 11 is a vertical section, taken through line 11, of Fig. 10, looking in the direction of the arrow. Fig. 12 is a side elevation of the pulley and belt shown in Fig. 10, still further modified. Fig. 13 is a vertical section, taken in the line 13, of Fig. 12, looking in the direction of the arrow. Fig. 14 is a plan sectional view of the movable partitions shown in Fig. 13, taken in line 14 of such figure, looking in the direction of the arrow, and Fig. 15 is an enlarged broken sectional view, taken in line 15 of Fig. 14, looking in the direction of the arrow.

In making my improvement in belts and pulleys for the centrifugal treatment of fine or powdery material for the separation of the more valuable from the more worthless particles, I make a pulley A, which is preferably of large diameter and of considerable width between its upper and its lower edges, when operating in a horizontal plane. As I have shown this pulley operating also in a vertical plane, where the terms "upper" and "lower" edges would hardly be appropriate description, I shall hereinafter use the term "extreme" edges in speaking of the width of the face of the pulley. I shall mainly describe the pulley as operating in a horizontal position, as it is so shown in most of the figures of the drawings, and shall only otherwise describe such peculiar or additional features as are particularly involved in the use of the pulley in a vertical position. I shall furthermore speak of the large pulley hereinafter as the "separating pulley," to distinguish it from others employed in the apparatus. The separating pulley is arranged in suitable frame work or bearings, and connected with suitable power by belts or otherwise to give it the necessary speed of rotation to develop the desired amount of centrifugal force for the separation of the particles to be treated. At convenient distance from the separating pulley I arrange another and preferably smaller pulley, B, which, for convenience, I will designate as a "tension pulley." Preferably between these two pulleys I arrange a third pulley, C, which I will term an idler. I prefer to make the separating pulley with the rim largely cut away, or of open work, forming spaces *a*, as shown in Figs. 4, 10 and 11, leaving simply sufficient face to afford a proper bearing surface for the belt in connection with which it is intended to be used. This makes the pulley really only substantially a frame work adapted to support and drive the belt. As a modification of this frame work pulley, I have shown it in Figs. 7, 8, 9, as provided with channels, grooves or depressions *a'*, so that the belt will not contact with the face of the pulley throughout its entire extent. These channels, grooves or depressions may be made either vertical or horizontal, and I have shown them both ways. I also prefer to make the face or bearing surface of the pulley beveled outwardly from the extreme edges to the center, so as to make it of larger diameter at or near the center, as shown in various figures of the drawings. I then provide a belt D, which, for convenience I will term a separating belt, which is of sufficient width to cover the face of the pulley and is preferably inclined from its extreme edges outward, to make it correspond to, or fit the form of the pulley, although a belt of ordinary construction may be used if desired, as the tension of the pulleys will bring it into proper shape. This belt is preferably provided with one or more lines of perforations $d$, as shown in several of the figures of the drawings, although it may be used without such perforations, as I have also illustrated in Figs. 12 and 13, if preferred. I arrange the belt around the separating pulley and around the tension pulley and on the inside of the idler, as particularly shown in Fig. 1, so that in its revolutions it will travel for part of its course in a circular direction, and then be deflected abruptly from its circular course, as shown. I provide the separating pulley with ledges or receiving surfaces, E, on which the material to be treated is deposited from material supply pipes, E'. The ledges or receiving surfaces communicate with the openings, grooves, channels or depressions in the rim or face of the separating pulley, as will be well understood from an inspection of Figs. 4 and 7 of the drawings, so that the material deposited upon the ledges or receiving surfaces will immediately be carried by the action of centrifugal force out upon the inner face of the separating belt.

To facilitate the separation of the material by diluting and washing it, I arrange water supply pipes, F, which lead from a proper source of water supply into and around the inner face of the rim of the separating pulley, where it is cut away, as shown in Fig. 4, or into the spokes or webs of the pulley, through conduits F' and thence out through orifices $f'$ to where the rim is provided with grooves, channels or depressions, and sprayed through perforations, as shown in Fig. 9. These perforations are indicated by the letter $f$ in the drawings, a few of which are shown in Fig. 4, though it will be understood that the pipes are supplied with a sufficient number. I desire also to say that while I have described the arrangement and location of the water spray pipes, and the means for supplying water, as they are illustrated in the drawings, I do not mean to limit myself to any specific arrangement of pipes or water supply, as any desired location or arrangement may be employed which will bring the water and spray it upon the material under treatment. To catch the heavier particles of the material being treated, which mostly contain the valuable material which it is desired to secure, I arrange receptacles, G, at that point in the travel of the belt where it is turned into a different circular direction.

The material being treated, as will be understood, is carried by the action of centrifugal force upon the inner surface of the separating belt, and the heavier particles caused to adhere to such surface as long as its course of travel is in a circular direction. When it is deflected from its normal circular direction, and turned into a different circular direction by the idler, the material adhering to it is thrown off at a tangent and caught in the receptacles G. It will of course be understood that before the belt reaches this point, the lighter particles have been carried across its surface and discharged through the perforations into a trough or curbing, G', adapted to receive them. In those cases, however, where the separating belt is not provided with perforations, all of the material will be carried around and discharged into the receptacle G. But whether the belt be provided with perforations or not the lighter particles will move across its surface toward its center, which, as above explained, is inclined outward from its extreme edges. When the belt, therefore, reaches the receptacles G, the heavier particles will occupy a position nearer the edges of the belt, and the lighter particles a position nearer its center. To prevent the heavier and lighter particles from being thrown together in the receptacle, I arrange in it a suitable number of movable partitions H, which may be adjusted in or out toward or from the center of the belt. To effect the adjustment of the partitions to the right position, I arrange a number of threaded rods $h$, which will move the partitions in or out by turning them in the one direction or the other. These partitions are thus adapted to divide the receptacles G into different compartments corresponding in position to the positions on the belt which will contain the heavier and the lighter particles respectively, as they reach the point where they are thrown off by the change in the circular course of travel of the belt. The lighter particles will thus be thrown into one compartment of the receptacle, and the heavier particles into another. These compartments are provided with pipes or chutes, $h'$, to carry the particles to their respective places of deposit. I have shown the threaded rods in Figs. 13, 14 and 15, as hollow, so that water may be introduced through them, into the compartments of the receptacle, to facilitate the washing out and removal of the particles caught in them. In Fig. 14, I have shown the partitions dividing the receptacle G as united together at their outer edges by a flexible connection $h^2$, which may be made of rubber, canvas, or some other similar material. To impart a vibration to the belt when desired, I have shown in Fig. 9 a corrugated roller or bumper, I, which is supported in a bracket, I', preferably in a flexible manner, by means of rubber rings or washers, $i$, so that it bears against the outer surface of the belt, and by means of its ridges or corrugations causes the belt to vibrate to facilitate the separation and discharge from it of the material being treated.

What I regard as new, and desire to secure by Letters Patent, is—

1. In centrifugal ore separators, the combination of a rotatable separating pulley provided with openings between its extreme edges, a tension pulley, and a belt traveling around the separating pulley during a portion of its course, and at a tangent to a circle in another portion of its course, substantially as described.

2. In centrifugal ore separators, the combination of a rotatable separating pulley provided with openings between its extreme edges and receiving ledges communicating with said openings, a tension pulley, and a belt traveling around the separating pulley during a portion of its course, and at a tangent to a circle in another portion of its course, substantially as described.

3. In centrifugal ore separators, the combination of a rotatable separating pulley provided with a belt bearing surface throughout only a portion of its face, a tension pulley and a belt provided with a separating surface and traveling around the separating pulley during a portion of its course and at a tangent to a circle in another portion of its course, substantially as described.

4. In centrifugal ore separators, the combination of a rotatable separating pulley, a tension pulley, and a belt provided with a separating surface between the extreme edges of the pulley, and traveling around the separating pulley during a portion of its course, and at a tangent to a circle in another portion of its course, substantially as described.

5. In centrifugal ore separators, the combination of a rotatable separating pulley, a tension pulley, a belt provided with a separating surface between the extreme edges of the pulley and traveling around the separating pulley during a portion of its course and at a tangent to a circle in another portion of its course, and receptacles for catching the material thrown off of the belt from different planes of its separating surface, substantially as described.

6. In centrifugal ore separators, the combination of a rotatable separating pulley, a tension pulley, and a belt provided with perforations or openings at or near its plane of largest diameter and traveling around the separating pulley during a portion of its course and at a tangent to a circle in another portion of its course, substantially as described.

ORRIN B. PECK.

Witnesses:
THOMAS A. BANNING,
SAMUEL E. HIBBEN.